(12) United States Patent
Xia et al.

(10) Patent No.: US 12,447,191 B2
(45) Date of Patent: Oct. 21, 2025

(54) TOPICAL APPLICATION OF POLYPEPTIDE IN THE TREATMENT OF SKIN DAMAGE

(71) Applicant: WUHAN YICHENG BIOTECHNOLOGY CO., LTD., Wuhan (CN)

(72) Inventors: Xianmin Xia, Wuhan (CN); Xiang Sun, Wuhan (CN); Chaoxing Li, Wuhan (CN); Jie Gao, Wuhan (CN); Xiuli Kuang, Wuhan (CN)

(73) Assignee: WUHAN YICHENG BIOTECHNOLOGY CO., LTD., Wuhan (CN)

( * ) Notice: Subject to any disclaimer, the term of this patent is extended or adjusted under 35 U.S.C. 154(b) by 540 days.

(21) Appl. No.: 18/155,747

(22) Filed: Jan. 18, 2023

(65) Prior Publication Data
US 2023/0218712 A1     Jul. 13, 2023

Related U.S. Application Data

(63) Continuation of application No. PCT/CN2021/108508, filed on Jul. 26, 2021.

(30) Foreign Application Priority Data

Jul. 26, 2020 (CN) .................. 202010726801.1

(51) Int. Cl.
| | | |
|---|---|---|
| A61K 38/00 | (2006.01) |
| A61K 9/06 | (2006.01) |
| A61K 38/10 | (2006.01) |
| A61K 47/10 | (2017.01) |
| A61K 47/12 | (2006.01) |
| A61K 47/32 | (2006.01) |
| A61K 47/44 | (2017.01) |
| A61P 17/02 | (2006.01) |

(52) U.S. Cl.
CPC ............. *A61K 38/10* (2013.01); *A61K 9/06* (2013.01); *A61K 47/10* (2013.01); *A61K 47/12* (2013.01); *A61K 47/32* (2013.01); *A61K 47/44* (2013.01); *A61P 17/02* (2018.01)

(58) Field of Classification Search
CPC .......... A61K 38/10; A61K 9/06; A61K 47/10; A61K 47/12; A61K 47/32; A61K 47/44; A61P 17/02
See application file for complete search history.

(56) References Cited

FOREIGN PATENT DOCUMENTS

| | | | | |
|---|---|---|---|---|
| CN | 112263672 A | * | 1/2021 | ............... A61P 27/02 |
| EP | 4241781 A1 | * | 9/2023 | ............... C07K 7/08 |

* cited by examiner

*Primary Examiner* — Jeanette M Lieb (57) ABSTRACT

The invention discloses a polypeptide for topical treatment on skin damages resulting from various causes such as burns, wounds or cuts. The polypeptide topical drugs in different dosage forms have good therapeutic effect on scald models and trauma models of animals with little toxic and side effects, and is an innovative drug with good development prospects, and is effective in topical application in treating skin damages resulting from various causes such as burns, wounds or cuts; safe; low toxic and quality controllable.

2 Claims, 6 Drawing Sheets
Specification includes a Sequence Listing.

Administration Group: Healing rate 80%    Control Group: Healing rate 61%

Figure 1

Administration Group: Healing rate 90%    Control Group: Healing rate 49%

Figure 2

Positive Drug Group

Control Group

Figure 3

Ointment Group

Control Group

Figure 4

Administration Group: Healing rate 55%   Control Group: Healing rate 42%

Figure 5

Administration Group: Healing rate 80%   Control Group: Healing rate 56%

Figure 6

Positive Drug Group         Control Group

Figure 7

Gel Group         Control Group

TOPICAL APPLICATION OF POLYPEPTIDE IN THE TREATMENT OF SKIN DAMAGE

CROSS-REFERENCE TO RELATED APPLICATIONS

The present application is a continuation-application of International Patent Application (PCT) No. PCT/CN2021/108508 filed on Jul. 26, 2021, which claims foreign priority of Chinese Patent Application No. 202010726801.1, filed on Jul. 26, 2020, the entire contents of which are hereby incorporated by reference.

SEQUENCE LISTING

The instant application contains a Sequence Listing which has been submitted electronically in ST.26 format and is hereby incorporated by reference in its entirety. Said ST.26 copy, created on Jan. 13, 2023, is named Yicheng2301.xml and is 2,019 bytes in size.

TECHNICAL FIELD

The present invention relates to the field of biomedicine, in particular to a topical application of polypeptide in the treatment of skin damage.

BACKGROUND ART

Trauma is the damage to human tissues or organs caused by external factors, such as machinery, high temperature, cold, current, radiation, acid, alkali, poisonous gas, poisonous insects, etc. Common trauma: traffic trauma, fall injury, mechanical injury, sharp weapon injury, fall injury, firearm injury, etc.

Burns and scalds are generally divided into first degree burn, superficial second degree burn, deep second degree burn, third degree burn and fourth degree burn according to their depth. Among them, the first degree burn only damages part of the epidermis, but the germinal layer is still alive, so the ability of proliferation and regeneration is active. It usually heals within 3-5 days without leaving scars. Superficial second degree burn, which damages the entire epidermis and part of the papillary layer. Because the germinal layer is partially damaged, epithelial regeneration depends on the proliferation of the remaining germinal layer and skin accessories, such as sweat glands and hair follicles. Deep second degree burn: the burn depth is below the dermal papillary layer, but there are still some dermis and skin appendages left. Healing depends on the proliferation of epithelial appendages, especially the epidermal progenitor cells in the hair follicle protrusion. Third degree burn, also known as eschar burn, generally refers to the whole process of skin burn. The epidermis, dermis and skin accessories are all damaged. The wound repair depends on surgical skin grafting or skin flap repair. Fourth degree burn, which extends to muscles, bones and even internal organs. Wound repair depends on surgical skin grafting or skin flap repair, and amputation is required in severe cases.

The existing effective drugs commonly used in the treatment of burns and deep wounds are growth factor gel, such as recombinant human epidermal growth factor (rh-EGF), recombinant human basic fibroblast growth factor (rh-bFGF), etc.

SUMMARY

The invention aims to disclose the use of a polypeptide in preparing skin damage drugs, the damage caused by various reasons such as burns, wounds or cuts. The polypeptide of the invention is an existing drug, and its sequence has 15 amino acids (SEQ ID No:1) is as follows:

```
Met Pro Tyr Ser Thr Glu Leu Ile Phe Tyr
1               5                   10

Ile Glu Met Asp Pro
                15
```

The invention provides the use of the polypeptide in preparing burn medicine; And the use of the polypeptide in the preparation of trauma drugs.

Preferably, when preparing burn medicine, wound medicine or skin defect drugs, the content of the polypeptide in the prepared medicine is >0.01% wt. The experimental data shows that the effect is effective when the content is >0.01% wt, and the effect is improved with the increase of the content. The effect is better when the content is 0.1% wt, and the difference of the effect is weakened when the content exceeds this value.

The polypeptide can inhibit scar hyperplasia and repair skin damage during the treatment of scald.

In addition, the invention also discloses the use of the polypeptide in preparing drugs for promoting cell differentiation.

Beneficial Effects

The polypeptide topical drugs in different dosage forms have good therapeutic effect on scald models and trauma models of animals with little toxic and side effects, and is an innovative drug with good development prospects, and is effective in topical application in treating skin damages resulting from various causes such as burns, wounds or cuts; safe; low toxic and quality controllable.

DETAILED DESCRIPTION OF THE EMBODIMENTS

The invention is further described in detail below in combination with the drawings and specific embodiments. The reagents or products used in the following embodiments, which are not marked with the source, are commercially available and are not used to limit the invention.

The polypeptide involved in the following embodiments or experiments has been disclosed in Chinese patent CN201410123289.6, and its sequence is shown in SEQ ID No:1.

Embodiment 1: Liquid Medicament

The Liquid medicament comprises the following raw materials: the polypeptide and normal saline.

The preparation method is: dissolve 0.1% the polypeptide by weight with normal saline.

Embodiment 2: Ointment Medicament

The ointment medicament includes the polypeptide, glycerin, stearic acid, ethyl hydroxybenzene, petrolatum and water, etc; The content of polypeptide is 0.1% wt.

The preparation method: glycerol, stearic acid, ethyl hydroxybenzene and petrolatum are heated and dissolved, stirred evenly to obtain the oil phase. The polypeptide is dissolved in water and slowly added into the oil phase, and stir them in the same direction until they are condensed.

Embodiment 3: Gel Medicament

The gel medicament comprising the polypeptide, water, copolymer of hydroxymethacrylate and crosslinking agent; The content of polypeptide is 0.1% wt.

The preparation method: the copolymer of hydroxymethacrylate and crosslinking agent and the polypeptide are dissolved respectively in water, and the two solutions are slowly poured into different molds. In a sterile environment, the copolymer hydrogel of hydroxymethacrylate and crosslinking agent is placed in the polypeptide aqueous solution until the aqueous solution is completely absorbed by the hydrogel, and the gel medicament is obtained.

The above embodiments 1 to 3 are to further illustrate the preparation methods and specific dosage forms of polypeptide drugs of the invention, and do not constitute the limitation of the scope of protection claimed by the invention. The content and dosage form of polypeptide in the drug can be adjusted according to actual needs.

The following will verify the therapeutic function of the medicament prepared in embodiments 1 to 3 on trauma and burns through experiments. The pharmacodynamic effects of polypeptide drugs were evaluated by establishing a rat burn model or a rat trauma model.

Animal Experiment 1

Experimental Purpose: to study the therapeutic effect of polypeptide drug of the invention on scald.

Experimental Drug:

Ointment medicament (Ointment prepared in embodiment 2);

Recombinant Human Epidermal Growth Factor Gel (yeast) (purchased in the market, produced by Guilin Warnover Gene Pharmaceutical Co., Ltd., GYZZ S20020111).

Experimental Animals: SD rats, half male and half female, 200 g±10 g.

The Modeling Scheme: the rats' back were depilated with 10% barium sulfide the day before the experiment, and anesthetized by intraperitoneal injection before scalding. The rat models were made with a constant temperature and pressure scald apparatus. After scalding, 5 ml lactate Ringer's solution was intraperitoneally injected immediately to prevent shock.

The criteria for successful modeling: disappearance of local epidermis; expansion of blood vessels in epidermis, dermis and subcutaneous tissue; edema of subcutaneous tissue; infiltration of acute and chronic inflammatory cells in dermis and subcutaneous tissue; the above description is a deep II degree burn.

Animal Grouping: 8 SD rats in total

Ointment Group (Ointment prepared in embodiment 2): 4 rats, half male and half female, scalded on both sides of the body. After scalding, one side was administered, and the other side was used as control.

Positive Drug Group (Recombinant Human Epidermal Growth Factor Gel): 4 rats, half male and half female, scalded on both sides of the body. After scalding, one side was administered, and the other side was used as control.

Modeling:

Animal Preparation: After shaving on the back of rats, 10% sodium sulfide solution was used for hair removal. After 24 hours, it was confirmed that the hair removal area was not damaged.

Injuring Instrument: Constant Temperature And Pressure Scalding Instrument.

Parameters of the Injuring Instrument: turn on 220 v AC, adjust the temperature of the scald to 80° C., and the pressure of the scald stick is 0.5 kg. Scalding head area is 2.5 cm$^2$. The scalding time was 8 s respectively.

Wound Site: with the upper end of the femur of the hind limb of the rat as the center point, make a burn wound on each side, symmetrically left and right.

Injury Process: first set the temperature, pressure and time of scald, adjust the animal's position and the flatness of the injured skin, the scald stick vertically contacts the skin surface, the countdown timer of the scald instrument automatically starts timing, when the timing is over, the timer rings, and quickly remove the scald stick from the skin surface.

Mode of Administration:

One side of the Ointment Group was smeared twice a day to cover the scalded wound for 14 consecutive days. The other side is not treated.

Positive Drug Group: one side was administered according to the drug instructions. The other side is not treated.

After 14 days of treatment according to the plan, the animals were killed, and the diseased parts were taken for HE staining.

Observations:

1. Observation and healing rate after 14 days.

Healing rate=healing area/initial wound area×100%

2. Perform HE pathological staining and take photos at 40× magnification.

Experimental Result

1. Photo Observation Results

Figure 1:
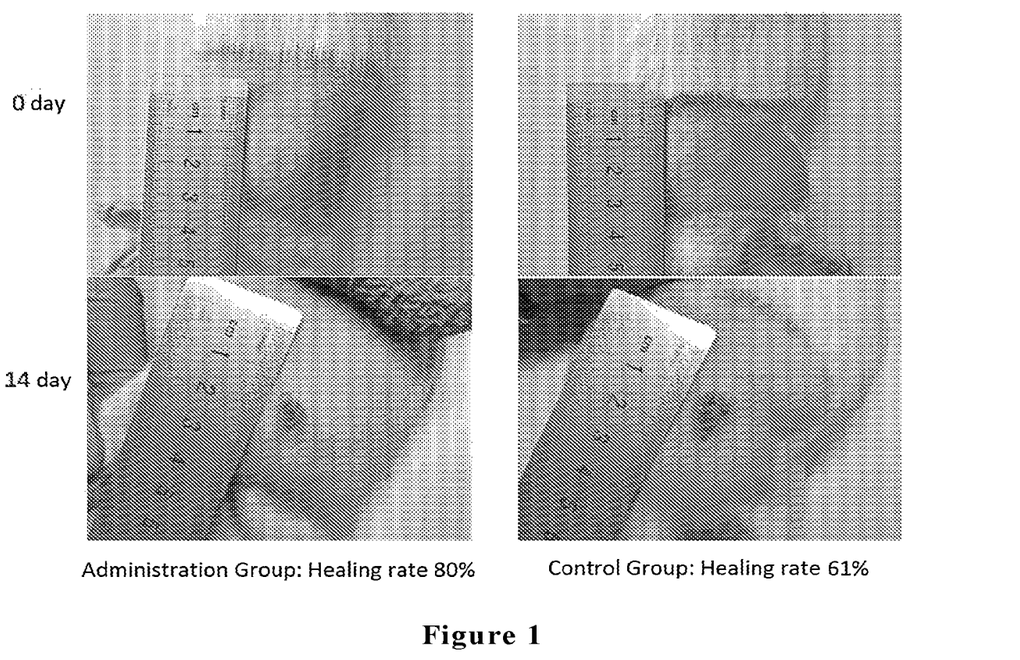
FIG. 1 shows the contrast photos of the Positive Drug Group before and after treatment after the successful modeling of burn and scald in animal experiment 1.
Figure 2:
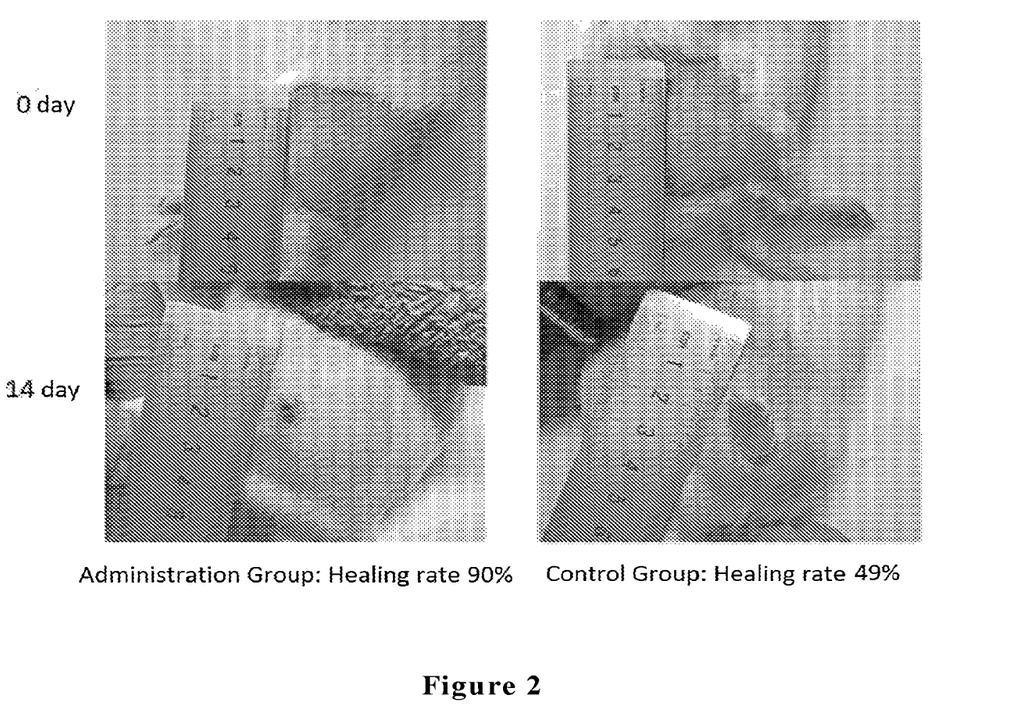
FIG. 2 shows the contrast photos of the Ointment Group before and after treatment after the successful modeling of burn and scald in animal experiment 1.

After 14 days of treatment according to the plan, various healing conditions are shown in FIGS. 1-2. It can be seen from the figures that the Ointment Group is better than the Positive Drug Group. The results suggest that polypeptide can obviously promote the wound healing of full-thickness skin defects in rats.

2. HE Pathological Staining Results

Figure 3:
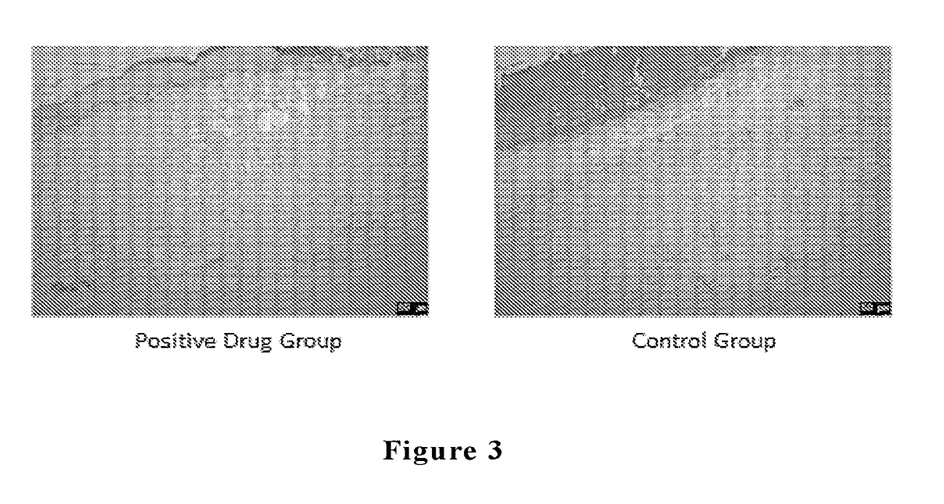
FIG. 3 is the picture of HE pathology of the Positive Drug Group and the positive control group after the successful modeling of burn and scald in animal experiment 1.
Figure 4:
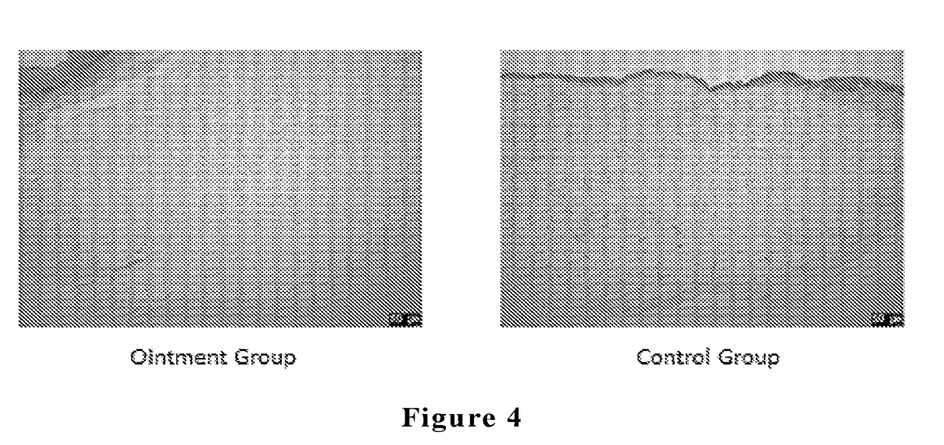
FIG. 4 is the picture of HE pathology of the Ointment Group and the ointment control group after the successful modeling of burn and scald in animal experiment 1.

After 14 days of treatment according to the plan, the animals were killed, and the diseased parts were taken for HE staining. See FIGS. 3-4 for details. In the Positive Drug Group, local epidermis was missing in the field of vision, and a small amount of necrotic cell fragments were visible. A large amount of granulation tissue was visible in the dermis, and a large number of fibroblasts and fibroblasts were found in the granulation tissue. In the Positive Drug Group, there was no large amount of eosinophilic exudate and necrotic cell fragments after recovery, while in the control groups, there were, indicating that the recovery effect of the administration groups (Positive Drug Group and Ointment Group) were better. A large amount of granulation tissue can be seen in the visual field of the Ointment Group, while a large amount of epidermal necrosis can be seen in the control group; To sum up, the Ointment containing the polypeptide can reduce the formation of new blood vessels in the inflamed area, promote the regeneration of epidermis and accelerate the recovery of the burned area.

Animal Experiment 2

Experimental purpose: to study the therapeutic effect of polypeptide drug of the invention on skin trauma Experimental Drug:

Gel medicament (Gel prepared in embodiment 3);

Recombinant Human Epidermal Growth Factor Gel (yeast) (purchased in the market, produced by Guilin Warnover Gene Pharmaceutical Co., Ltd., GYZZ S20020111).

Experimental Animals: SD rats, half male and half female, 200 g±10 g.

The Modeling Scheme: the rats' back was depilated with 10% barium sulfide the day before the experiment, and anesthetized by intraperitoneal injection before scalding. After disinfection, the rats' back was cut at both sides of the spine with a round medical puncher with a diameter of 8 mm, and the full-thickness skin was cut from the back of the rats, deep to the fascia, to form a whole cortex skin trauma animal model, which was fed in separate cages.

Animal Grouping: 8 SD rats in total

Gel Group (Gel prepared in embodiment 3): 4 rats; half male and half female, were made into models on both sides, one side was administered, and the other side was used as control.

Positive Drug Group (Recombinant Human Epidermal Growth Factor Gel): 4 rats; half male and half female, were made into models on both sides, one side was administered, and the other side was used as control.

Animal Preparation: After shaving on the back of rats, 10% sodium sulfide solution was used for hair removal. After 24 hours, it was confirmed that the hair removal area was not damaged.

Wound Site: with the upper end of the femur of the hind limb of the rat as the center point, make a cut on each side, symmetrically left and right.

Mode Of Administration:

One side of the Gel Group was smeared twice a day to cover the scalded wound for 14 consecutive days. The other side is not treated.

Positive Drug Group: one side was administered according to the drug instructions. The other side is not treated.

After 14 days of treatment according to the plan, the animals were killed, and the diseased parts were taken for HE staining.

Observations:

1. Observation and healing rate after 14 days.

Healing rate=healing area/initial wound area×100%

2. Perform HE pathological staining and take photos at 40× magnification.

Experimental Result

1. Photo Observation Results

Figure 5:
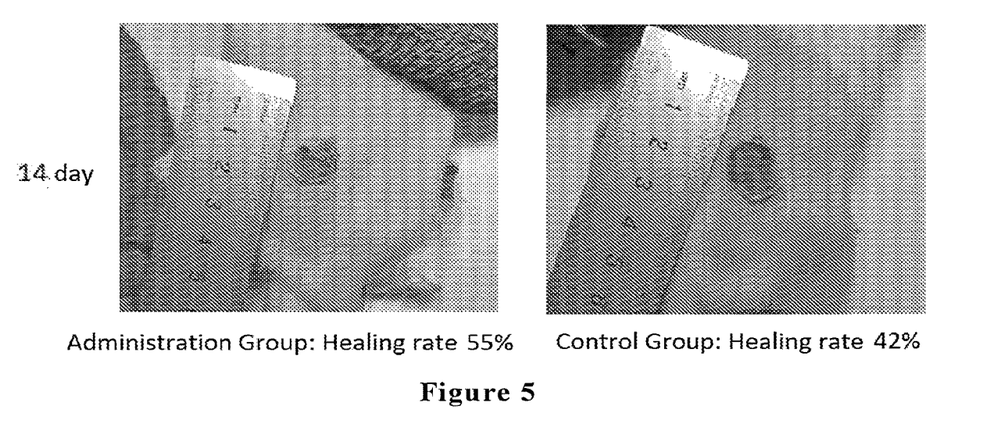
FIG. 5 is the contrast photo of the Positive Drug Group after treatment after successful skin trauma modeling in animal experiment 2.
Figure 6:
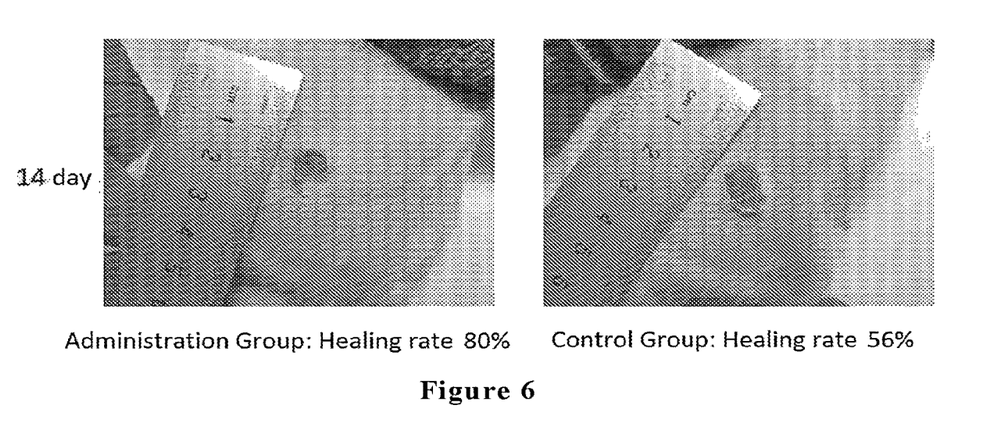
FIG. 6 is the contrast photo of the Ointment Group after the successful modeling of skin trauma in animal experiment 2.

After 14 days of treatment according to the plan, the cut wound surface of rats in each group has been completely scabbed, and new epithelia of different degrees have appeared, as shown in FIGS. 5-6. The software was used to accurately calculate the wound area of each group and calculate the wound healing rate of rats, which was expressed by the wound healing rate. The Gel Group was higher than the Positive Drug Group. The results suggested that the Polypeptide Gel could significantly promote the wound healing of full-thickness skin defects in rats.

2. HE Pathological Staining Results

Figure 7:
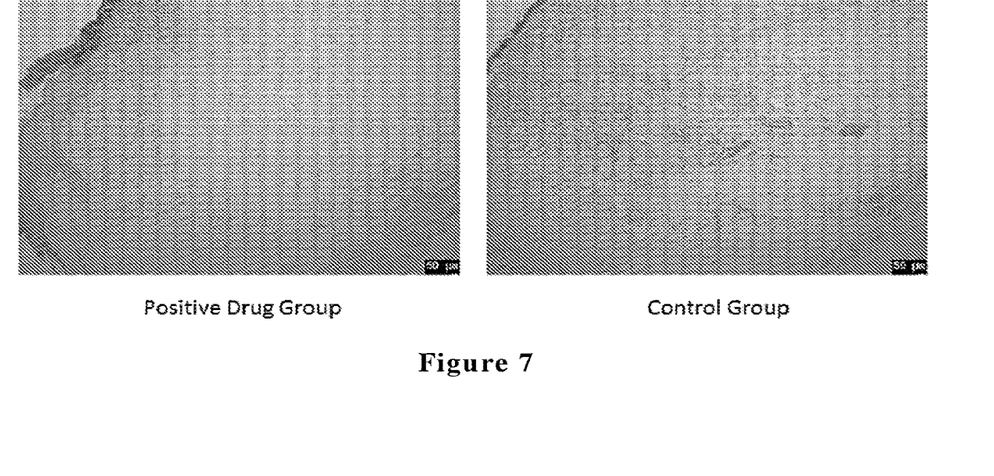
FIG. 7 is the picture of HE pathology of the Positive Drug Group and the positive control group after successful skin trauma modeling in animal experiment 2.
Figure 8:
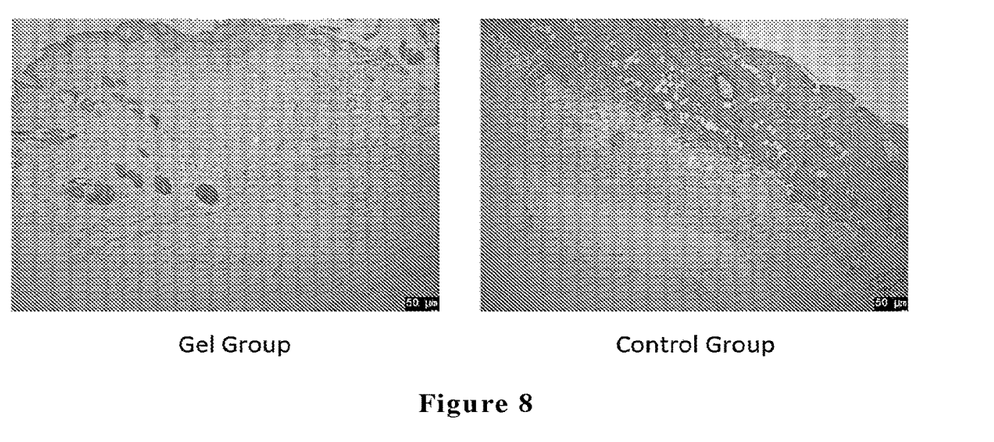
FIG. 8 is the picture of HE pathology of Gel Group and gel control group after successful modeling of skin trauma in animal experiment 2.

After 14 days of treatment according to the plan, the animals were killed, and the diseased parts were taken for HE staining. See FIGS. 7-8 for details. On the 14th day after injury, in the Gel Group, the surface of the new granulation tissue was covered by thick and continuous epithelial tissue, fibroblasts were basically transformed into long spindle fibroblasts, and the inflammatory reaction was basically disappeared, while in the Positive Drug Group, the wound scab was still visible, and the epithelial layer was thin. In the two control groups, there were no epidermis in the visual field, a large number of eosinophilic exudates and necrotic cell fragments were seen outside the dermis, and the dermal hair follicles and sebaceous glands disappeared. It can be seen that the administration groups (Positive Drug Group and Gel Group) are better than the control groups, and the Gel Group recovers better than the Positive Drug Group.

Conclusion

In the above animal experiments, the polypeptide drugs have significant therapeutic effects, and no significant effects have been observed in the animals using polypeptide drugs. It can be seen that the polypeptide drugs have good therapeutic effect and less toxic and side effects on animal burn models and trauma models, and are an innovative drug with good development prospects and effective, safe, low toxic and controllable quality for treating burns.

Next, we will invite volunteers to try the Ointment Medicament (Ointment prepared in embodiment 2). In order to further prove the therapeutic effect of polypeptide ointment, we now provide some cases for reference.

Figure 9:
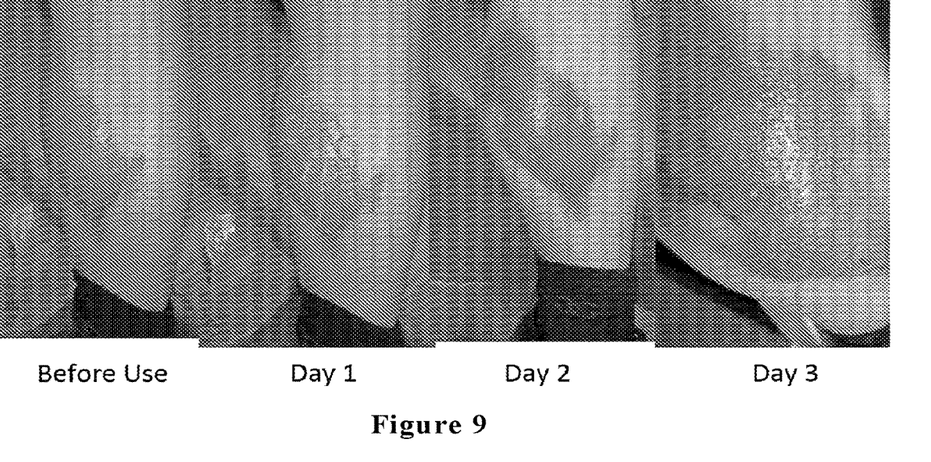
FIG. 9 shows the comparison between the photos before and after using the Ointment Medicament in case 1.

Case 1: Song (name of person), male, scalded by boiling water for 5 days. Disinfect the surrounding skin with alcohol, cut off the dead skin, wash the wound with salt water, dry it, then apply the polypeptide ointment, and cover it with two layers of gauze. The photos before and after use are shown in FIG. 9. The color of the first day after medication is darker than that of yesterday morning, and there is still a little pain. There is a little yellow exudate, which is considered to be related to tissue repair and inflammation. The color was lighter the next day after the drug was used, and there was no secretion. On the third day after the drug was used, the inflammation had been controlled, the wound was being repaired, and the pain was significantly relieved.

Figure 10:
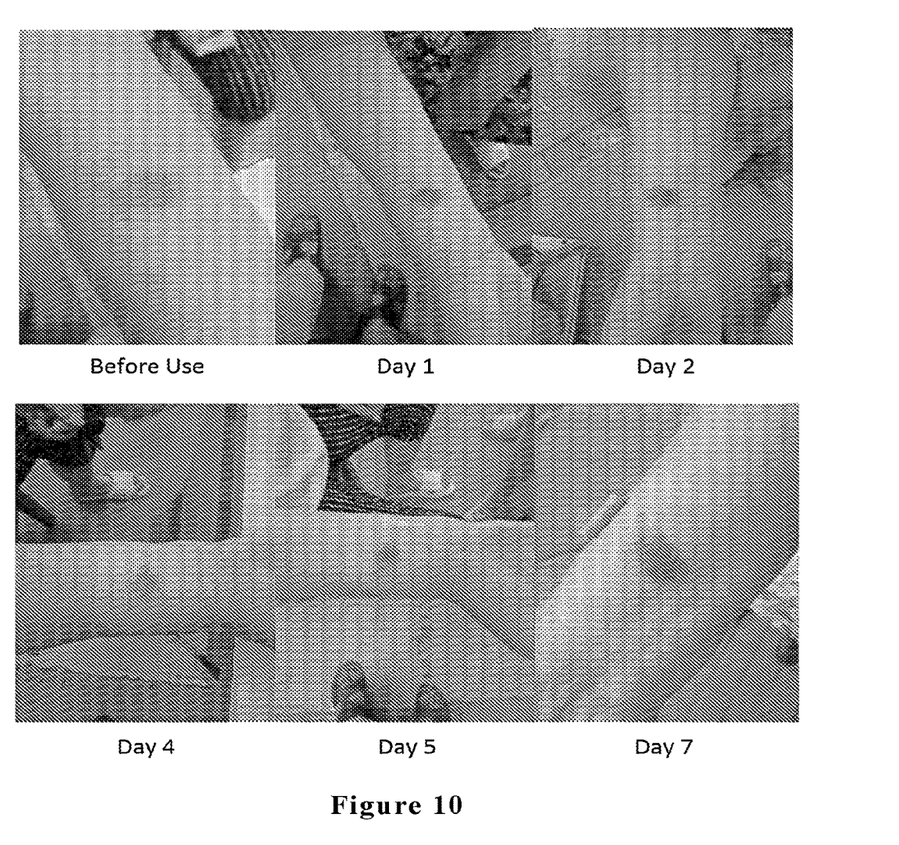
FIG. 10 shows the comparison between the photos of the patient before and after using the Ointment Medicament in Case 2.

Case 2: Zhang (name of person), female. The iron pot was scalded for two days. It blistered and broke itself. It hurt. After disinfection with alcohol, the polypeptide ointment is applied. The photos before and after use are shown in FIG. 10. On the first day of administration, the color of case 1 was red. On the second day of medication, the wound was dry, without secretion or infection. The epidermis was peeling off and the new tissue was growing. On the fourth day of medication, the mouth became dry, the color became lighter, and new tissues were growing. On the fifth day of medication, the wound became light and dry, and the tissue repair was fast. The wound was healed on the seventh day of medication.

Cell Differentiation Experiment

1. Cell Resuscitation:
(1) HaCAT cells (human immortalized epidermal cells, purchased from Wuhan University Cell Preservation Center, GDC106) are taken out of liquid nitrogen, quickly put into a 37° C. water bath, and gently shake the cryopreservation tube to dissolve the cryopreservation solution;
(2) After dissolution, the HaCAT cells were transferred to a centrifuge tube containing 5 ml of culture medium. The cells were collected by centrifugation, centrifuged at 1000 rmp at room temperature for 5 min, and the supernatant was discarded;
(3) The HaCAT cells were suspended in a complete medium containing 10% fetal bovine serum, inoculated into a culture dish, gently blown and mixed, and cultured at 37° C. and 5% $CO_2$ saturated humidity.

2. Cell Passage:

When the cell density reaches 80%, the HaCAT cells will be subcultured:
(1) Discard the culture medium and wash it once with PBS;
(2) Add 1-2 ml 0.25% trypsin to digest the cells. Observe under the microscope. Digest for 1-2 min. It can be seen that the cells are separated from each other and become round, that is, the digestion is completed;
(3) Quickly discard the trypsin, add the complete culture medium, blow the cells to make a single cell suspension, pass the passage in a ratio of 1:3, and expand the culture under 37° C. and 5% $CO_2$ saturated humidity.

Figure 11:
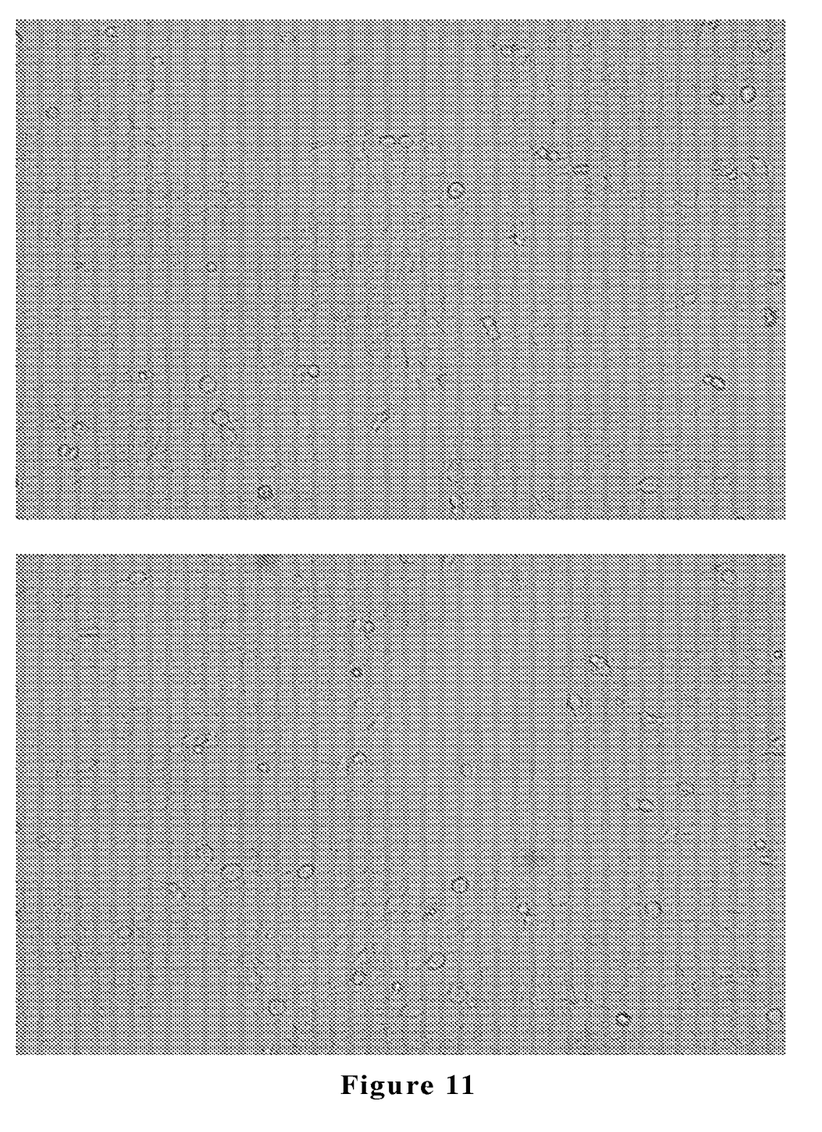
FIG. 11 shows the differentiation status of HaCAT cells treated with the polypeptide.

3. Cell Treatment
(1) Planking: HaCAT cells in logarithmic growth phase were taken, digested with 0.25% trypsin, and suspended with DMEM medium (10% FBS+1% double antibody), and then $1\times10^5$/well, inoculated with 6-well plate, and cultured overnight at 37° C. and 5% $CO_2$ saturated humidity.
(2) HaCAT cells+10 μL polypeptide (10 mg/ml) for 48 h.
(3) Take photos to observe that normal cells are round and have long antennae after differentiation, as shown in FIG. 11, some cells are differentiated under the action of polypeptides.

What is claimed is:

1. A method for treating skin damage, comprising: administering an effective amount of a polypeptide drug for daubing; the polypeptide drug comprises a polypeptide with an amino acid sequence as shown in SEQ ID No:1; the skin damage is a full-thickness skin defect; or the skin damage caused by a superficial second degree burn, deep second degree burn or third degree burn.

2. The method according to claim 1, wherein the polypeptide concentration in the polypeptide drug is greater than or equal to 0.01% wt.

* * * * *

SEQUENCE LISTING

```
Sequence total quantity: 1
SEQ ID NO: 1           moltype = AA  length = 15
FEATURE                Location/Qualifiers
source                 1..15
                       mol_type = protein
                       organism = synthetic construct
SEQUENCE: 1
MPYSTELIFY IEMDP                                                    15
```